3,458,418
PROCESS FOR CARRYING OUT PHOTOCHEMICAL REACTIONS AND APPARATUS THEREFOR
Wilhelm Beckmann, Limburgerhof, Pfalz, Germany, assignor to Badische Anilin- & Soda-Fabrik Aktiengesellschaft, Ludwigshafen (Rhine), Germany
Filed Mar. 15, 1966, Ser. No. 534,379
Claims priority, application Germany, Mar. 19, 1965,
B 81,067
Int. Cl. B01j 1/10
U.S. Cl. 204—157.1                                     4 Claims

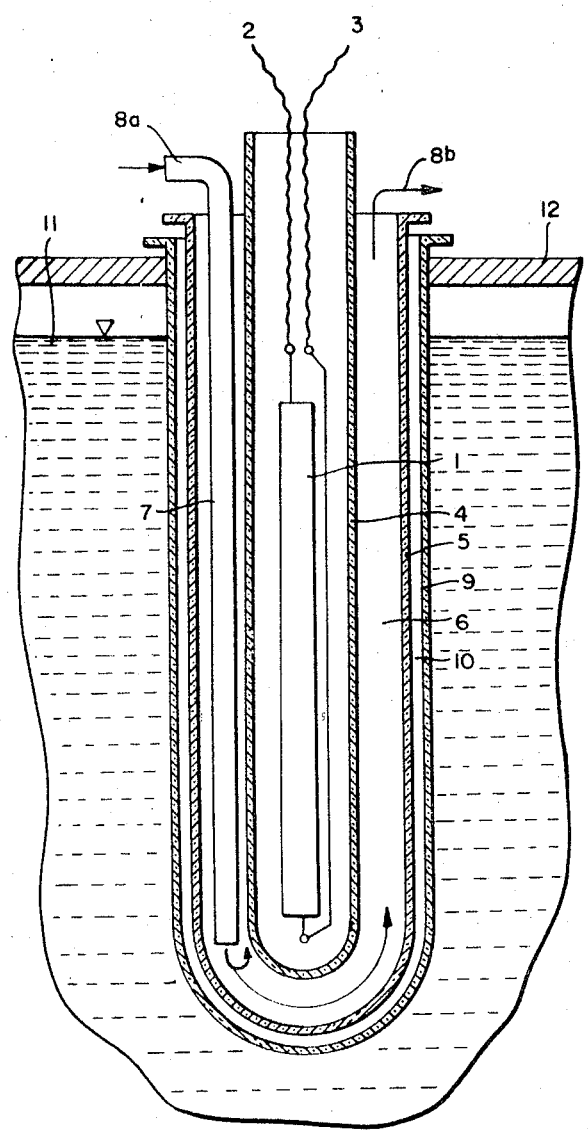

ABSTRACT OF THE DISCLOSURE

Photochemical reactions and apparatus therefor embodying a reaction chamber with a liquid-cooled lamp which is surrounded by an inner tube which in turn, is surrounded by an outer tube to form a cooling chamber provided with an inlet pipe and an outlet pipe for conveying a coolant through the cooling chamber, the outer tube being surrounded by a second outer tube to form an insulating space around the cooling chamber.

---

This invention relates to an improvement in withdrawal of heat when carrying out photochemical reactions with a liquid-cooled lamp dipping into the reaction chamber.

Photochemical reactions are being used to an increasing extent today, definite wavelengths of the light emitted from a source of light causing the desired chemical reaction. Discharge lamps in particular having outputs of 10 kw. or more have been developed as light sources for this purpose. These lamps are advantageously dipped into the reaction liquid but protected from direct contact therewith by a glass tube closed at one end which is slipped over the lamp. This glass tube must be such that it allows the passage with no reduction in intensity of rays which are within the spectral range of chemical activity.

In the present state of light technology, only a portion of the transformed electrical energy can be radiated in the wavelength range of chemically active radiation. By far the greater part, about 70 to 80%, has no chemical action, is converted into heat and therefore has to be carried away.

In many cases photochemical reactions proceed at a temperature of 20° C. or less, for example in photooximation. Higher temperatures than this either lead to poorer yields or wholly prevent the desired reaction. Provision must therefore be made to prevent the reaction liquid from being excessively heated by the radiation of heat from the lamp. This may be effected by cooling the reaction liquid in the reactor by installing cooling units and thus keeping it at low temperature. Cooling brine may be used as the coolant. Cooling plant having a large output is therefore required and this is expensive in outlay and in operation.

Transmission of the heat produced into the reaction liquid may also be prevented by introducing a cooling liquid between the lamp and the reaction liquid, said cooling liquid permitting passage of the chemically active radiation. Water is an example of such a liquid. For this purpose a second glass tube is slipped over the first, thus providing an annular space for the cooling liquid to be passed through.

The cooling liquid must not contain any impurities which might hinder the passage of the chemically active rays. Moreover it should be passed through at the temperature of the reaction liquid so that no heat is given off by it to the reaction liquid through the wall of the glass tube between them. This latter requirement may be mitigated in accordance with French Patent 1,324,096 by providing a still larger glass tube so that the cold cooling water first flows down through the outermost annular space immediately adjacent to the reaction liquid and then flows up through the inner annulus and is heated up therein.

This arrangement has only limited effectiveness however because if there is a marked rise in temperature of the cooling liquid, radial dissipation of heat to the reaction liquid cannot be prevented. In all cases however the cooling liquid either has to be recycled and recooled with a cooling plant instead of the reaction liquid, or large amounts of completely pure cold water have to be continually available which are discharged behind the plant.

The object of this invention is to provide a method for carrying out photochemical reactions with a liquid-cooled lamp projecting into the reaction chamber, and in accordance with the invention the coolant whose temperature is higher than the temperature of the reaction liquid, is led into the cooling chamber and withdrawn again and the chamber filled with coolant is thermally insulated by another chamber which is filled with gas and which permits unhindered passage of the chemically active radiation.

To make the thermal insulation of the said chamber as effective as possible, the insulating chamber is subjected to subatmospheric pressure.

For the same reason, the gas-filled chamber should be charged with a gas which has the lowest possible coefficient of thermal conductivity.

Apparatus for carrying out photochemical reactions may consist for example of a lamp projecting into the reaction chamber, an inner cooling tube surrounding the lamp and an outer cooling tube surrounding the inner cooling tube and thus forming the cooling chamber, wherein the outer cooling tube is surrounded in spaced relationship by an insulating tube which dips directly into the reaction liquid and forms the insulating chamber.

The distance between the outer cooling tube and the insulating tube may be from 5 to 15 mm., the thickness of the layer in the gas-filled insulating chamber being such that it is impossible for convection currents to form so that good thermal insulation results.

An embodiment of apparatus in accordance with this invention is shown diagrammatically in the accompanying drawing by way of example.

A lamp 1 located in the interior of the apparatus is connected by two wires 2 and 3 to an electric circuit. An inner glass tube 4, closed at the bottom, surrounds the lamp 1. A middle glass tube 5, of larger diameter and closed at the bottom, is provided surrounding the inner cooling tube 4. An annular space 6 is thus formed between the tubes 4 and 5. Cooling liquid is passed to the bottom of the tube 5 through a pipe 7 into the annular space 6. The cooling liquid is supplied at 8a and leaves the annular space 6 at 8b.

Another outer glass tube 9 which is closed at the bottom and whose internal diameter is only slightly larger than the external diameter of the glass tube 5 is slipped over the middle glass tube so that an outer annular space 10 is formed between the tubes 5 and 9. The outer annular space may be evacuated or filled with dry inert gas.

The whole of the apparatus contained in the outer glass tube 9 dips into the liquid 11 which is contained in a container 12.

The annular space 10 formed by the glass tubes 5 and 9 serves as a thermal insulating layer which substantially prevents transmission of heat from the hot cooling liquid to the cold reaction liquid by conduction and convection by reason of the vacuum or the gas having poor thermal conductivity. Provided the type of glass is chosen correctly, however, the chemically active radiation may pass unhindered through it. Long wave and chemically inactive rays of light are held back by the glass wall of the tube 4 which becomes heated accordingly and in turn gives off the heat to the cooling liquid thereby heating it up.

The cooling liquid upon entry may have a temperature of 60° C. or more so that it may be recycled and recooled to the temperature of entry with ordinary cooling water in a cooler situated outside the plant. A cooling unit which is expensive in outlay and operation is thus made unnecessary. On the other hand transfer of heat from the reaction liquid to the coolant can be prevented by the said insulating layer if the reaction liquid is at a higher temperature than the coolant.

I claim:

1. In a process for carrying out photochemical reactions with a liquid-cooled lamp immersed in the reaction liquid, the improvement comprising introducing a cooling liquid into and withdrawing from a cooling chamber about said lamp at a cooling liquid temperature above the temperature of said reaction liquid, and thermally insulating from the reaction liquid the heat in said cooling liquid by use of a gas-filled chamber surrounding said cooling chamber, and permitting chemically active radiation to pass unhindered through said chamber into said reaction liquid.

2. The improvement as claimed in claim 1 wherein said gas-filled chamber is maintained at sub-atmospheric pressure.

3. Apparatus for carrying out photochemical reactions comprising a lamp adapted to dip into a reaction chamber, an inner cooling tube surrounding the lamp in turn surrounded by an outer cooling tube to form a cooling chamber for the reception of a coolant, and a second outer tube surrounding the outer tube and spaced therefrom to form an insulating space.

4. Apparatus as claimed in claim 3 wherein the distance between the outer tube and the second outer tube is from 5 to 15 mm.

References Cited

UNITED STATES PATENTS 3,090,739  5/1963  Ito _____ 204—162
3,309,298  3/1967  Ito et al. _____ 204—193 X

HOWARD S. WILLIAMS, Primary Examiner

U.S. Cl. X.R.

204—158, 162, 163, 193; 250—49.5